US012663047B2

(12) United States Patent
Ryu et al.

(10) Patent No.: US 12,663,047 B2
(45) Date of Patent: Jun. 23, 2026

(54) INTEGRATED ACTUATOR ASSEMBLY FOR DISCONNECTOR DEVICE AND ELECTRONIC LIMITED SLIP DIFFERENTIAL DEVICE

(71) Applicants: HYUNDAI MOTOR COMPANY, Seoul (KR); KIA CORPORATION, Seoul (KR)

(72) Inventors: Young-Bae Ryu, Hwaseong-si (KR); Kang-Soo Seo, Hwaseong-si (KR); Jin-Seung Lim, Hwaseong-si (KR); Jae-Weon Jun, Hwaseong-si (KR); Sang-Bum Baek, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 19/176,724

(22) Filed: Apr. 11, 2025

(65) Prior Publication Data

US 2026/0126086 A1     May 7, 2026

(30) Foreign Application Priority Data

Nov. 5, 2024    (KR) ........................ 10-2024-0155325

(51) Int. Cl.
*F16D 23/14* (2006.01)
*B60K 17/02* (2006.01)
(Continued)

(52) U.S. Cl.
CPC .............. *F16D 23/14* (2013.01); *B60K 17/02* (2013.01); *F16D 13/52* (2013.01);
(Continued)

(58) Field of Classification Search
CPC .............. F16D 2023/123; F16D 23/14; F16D 2125/36; F16D 13/52; F16D 11/14; F16H 48/22
See application file for complete search history.

(56) References Cited

U.S. PATENT DOCUMENTS

2012/0053002 A1* 3/2012 Schmidt .................. F16D 28/00
                                                          475/231
2013/0310209 A1* 11/2013 Downs .................. F16H 57/029
                                                          475/221

(Continued)

FOREIGN PATENT DOCUMENTS

DE      102018213163 A1 * 2/2020  .............. F16D 11/10
KR      2023-0025175 A      2/2023

*Primary Examiner* — Stacey A Fluhart
(74) *Attorney, Agent, or Firm* — MCDONNELL BOEHNEN HULBERT & BERGHOFF LLP

(57) ABSTRACT

An integrated actuator assembly for a disconnector device and an electronic limited slip differential (eLSD) device includes a driving motor, a shift fork sliding in an axial direction of an output shaft of the disconnector device according to a fastened state of the disconnector device in which an outer case and an inner case of the disconnector device are fastened, a piston unit including a piston pressing a multi-plate clutch in the axial direction of the output shaft so that the eLSD device is in an operation state in which the multi-plate clutch of the eLSD device is operated, and a ball ramp operation unit sliding the shift fork and the piston unit to operate in a direction away from each other as rotated by the driving motor.

19 Claims, 12 Drawing Sheets

(51) Int. Cl.
   *F16D 13/52*      (2006.01)
   *F16D 23/12*      (2006.01)
   *F16D 125/36*     (2012.01)
   *F16H 48/20*      (2012.01)

(52) U.S. Cl.
   CPC .. *F16D 2023/123* (2013.01); *F16D 2023/141*
   (2013.01); *F16D 2125/36* (2013.01); *F16H*
   *48/20* (2013.01)

(56)                References Cited

U.S. PATENT DOCUMENTS

2018/0106353 A1*  4/2018  Guarino ................. B60K 23/04
2021/0270354 A1*  9/2021  Bhurke .................. F16H 48/22
2021/0348675 A1* 11/2021  Zink ...................... F16D 23/12
2023/0133502 A1*  5/2023  Freiholtz ............... B60K 17/16
                                            475/150

* cited by examiner

DISCONNECTOR
: OFF

DISCONNECTOR
: ON

DISCONNECTOR : ON

DISCONNECTOR
: ON

INTEGRATED ACTUATOR ASSEMBLY FOR DISCONNECTOR DEVICE AND ELECTRONIC LIMITED SLIP DIFFERENTIAL DEVICE

CROSS REFERENCE TO RELATED APPLICATIONS

This application claims priority to Korean Patent Application No. 10-2024-0155325, filed on Nov. 5, 2024, which is incorporated herein by reference in its entirety.

BACKGROUND

Field of the Disclosure

The present disclosure relates to an integrated actuator assembly for a disconnector device and an electronic limited slip differential (eLSD) device, which may sequentially operate the disconnector device and eLSD for a vehicle using one actuator.

Description of Related Art

Since four-wheel drive electric vehicles experience drag loss in a non-driven wheel when two wheels are driven or during coasting traveling, a disconnector device for mechanically blocking connection between the non-driven wheel and a motor and a reducer is provided.

The disconnector device allows an electric vehicle to selectively travel using four wheels and two wheels to reduce no-load drag loss.

In addition, a separate electronic limited slip differential (eLSD) device is installed to improve the traveling performance of the vehicle and compensate for the loss of a driving force due to wheel slip, etc. When the eLSD device is provided, handling performance and starting performance are improved.

Both the disconnector device and the eLSD device need to be provided in the vehicle, which increases the production cost and weight of the vehicle.

In particular, when the disconnector device and the eLSD device are installed inside the vehicle, a large amount of space, such as a space in which the disconnector device and the eLSD device are installed and a space in which an actuator for operating the disconnector device and the eLSD device is installed, is required. Since the actuator is mounted outside the reducer, the actuator needs to have little space for mounting, and application of an actuator (e.g., a hydraulic actuator or a dedicated motor for an eLSD device) for operating a wet multi-plate clutch of the above eLSD device is ideal. However, since the actuator is installed outside the disconnector or the eLSD device, a large amount of space is inevitably needed to install the actuator.

SUMMARY

The present disclosure is provided to solve the above problems and is directed to providing an integrated actuator assembly for a disconnector device and an electronic limited slip differential (eLSD) device, which can minimize a space required for installation and operation by sequentially operating a disconnector device and an eLSD device using one driving motor.

To achieve the above object, an integrated actuator assembly for a disconnector device and an electronic limited slip differential (eLSD) device according to the present disclosure includes a driving motor, a shift fork sliding a fastened state of the disconnector device in which an outer case and an inner case of the disconnector device are fastened in an axial direction of an output shaft, a piston unit including a piston pressing a multi-plate clutch of the eLSD device in the axial direction of the output shaft so that the eLSD device is in an operation state in which the multi-plate clutch is operated, and a ball ramp operation unit sliding the shift fork and the piston unit to operate in a direction away from each other as rotated by the driving motor, wherein the ball ramp operation unit allows the eLSD device to be in the operation state after rotating at a predetermined angle since the disconnector device has been fastened.

The ball ramp operation unit includes a fixed ramp rotated by the driving motor, a shift guide having a slot having a predetermined profile along circumference thereof formed therein, connected to the fixed ramp to change a rotation motion to a linear motion of the fixed ramp, and sliding the shift fork, a movable ramp slid by the rotation of the fixed ramp and sliding the piston unit, and a ball disposed between the fixed ramp and the movable ramp and pushing the movable ramp to the multi-plate clutch by the rotation of the fixed ramp.

An extension extending toward the shift guide is formed on one side surface of the fixed ramp, and a finger of which an end portion is inserted into the slot is formed on the extension, and when the fixed ramp rotates, the finger slides the shift guide while rotating inside the slot.

The slot of the shift guide has a first rotation section at a predetermined angle in a circumferential direction of the shift guide, an inclined section connected to the first rotation section, and a second rotation section connected to the inclined section and formed in the circumferential direction of the shift guide to be positioned closer to the fixed ramp than the first rotation section.

When the finger of the fixed ramp is positioned in the first rotation section, the disconnector device is in a non-fastened state and the eLSD device is in a non-operation state, when the finger of the fixed ramp enters the inclined section from the first rotation section and passes through the inclined section, the disconnector device is changed to a fastened state and the eLSD device is in the non-operation state, and when the finger of the fixed ramp is positioned in the second rotation section, the disconnector device maintains the fastened state and the eLSD device is changed to the operation state.

The second rotation section is formed to be longer than the first rotation section, and while the fixed ramp rotates in a state in which the finger is positioned in the second rotation section, the fixed ramp pushes the movable ramp.

The slot is formed as a plurality of slots in the circumferential direction of the shift guide, and each slot has the same profile.

The disconnector device has a sleeve connected to the shift fork to slide along the output shaft so that the outer case and the inner case are fastened, and the sleeve is slid as the shift fork slides.

A ball accommodation groove having a predetermined depth from the other side surface of the fixed ramp and accommodating the ball at a predetermined angle in a rotation direction of the fixed ramp is formed on the other side surface of the fixed ramp.

When the fixed ramp rotates and the ball is positioned between two adjacent ball accommodation grooves, the movable ramp is pushed toward the multi-plate clutch.

The ball is disposed as a plurality of balls at an interval in the rotation direction of the fixed ramp, and a cage is provided so that the plurality of balls maintain the interval.

A piston protruding toward the multi-plate clutch along circumference of the piston unit is formed on the piston unit.

A gear unit is formed on circumference of the fixed ramp, and the gear unit is engaged with a driving gear provided on the output shaft of the driving motor.

The gear unit is formed at a predetermined angle in the circumferential direction of the fixed ramp.

A return spring elastically supporting the piston unit in a direction away from the multi-plate clutch is formed on the other side surface of the piston unit.

According to the integrated actuator assembly for a disconnector device and an electronic limited slip differential device of the present disclosure having the above configuration, it is possible to minimize the space required for installation and operation by sequentially operating the disconnector device and the electronic limited slip differential (eLSD) device using one driving motor.

In addition, since the integrated actuator assembly is applied inside the reducer, it is possible to reduce the total length of the assembly of the disconnector device and the electronic limited slip differential device, thereby reducing the space required for installation and increasing the degree of freedom in installation.

By operating the disconnector device and the eLSD device using one driving motor, it is possible to reduce the number of overlapping parts, simplify the structure, and save the production cost.

BRIEF DESCRIPTION OF THE FIGURES

FIG. 7A is a side view illustrating the disconnector device-eLSD device using the integrated actuator assembly for a disconnector device and an eLSD device according to the present disclosure when the disconnector device is turned on and the eLSD device is turned off.

Figure 7A:
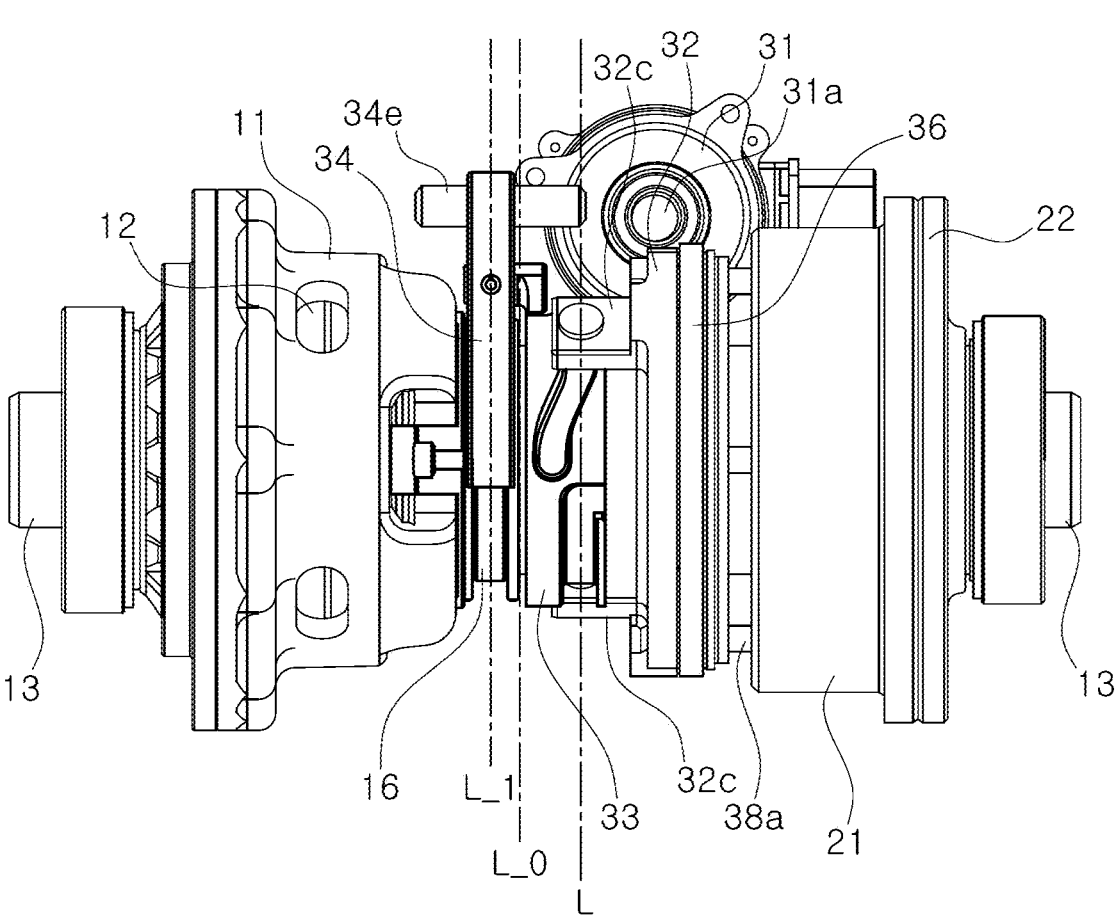
Figure 7B:
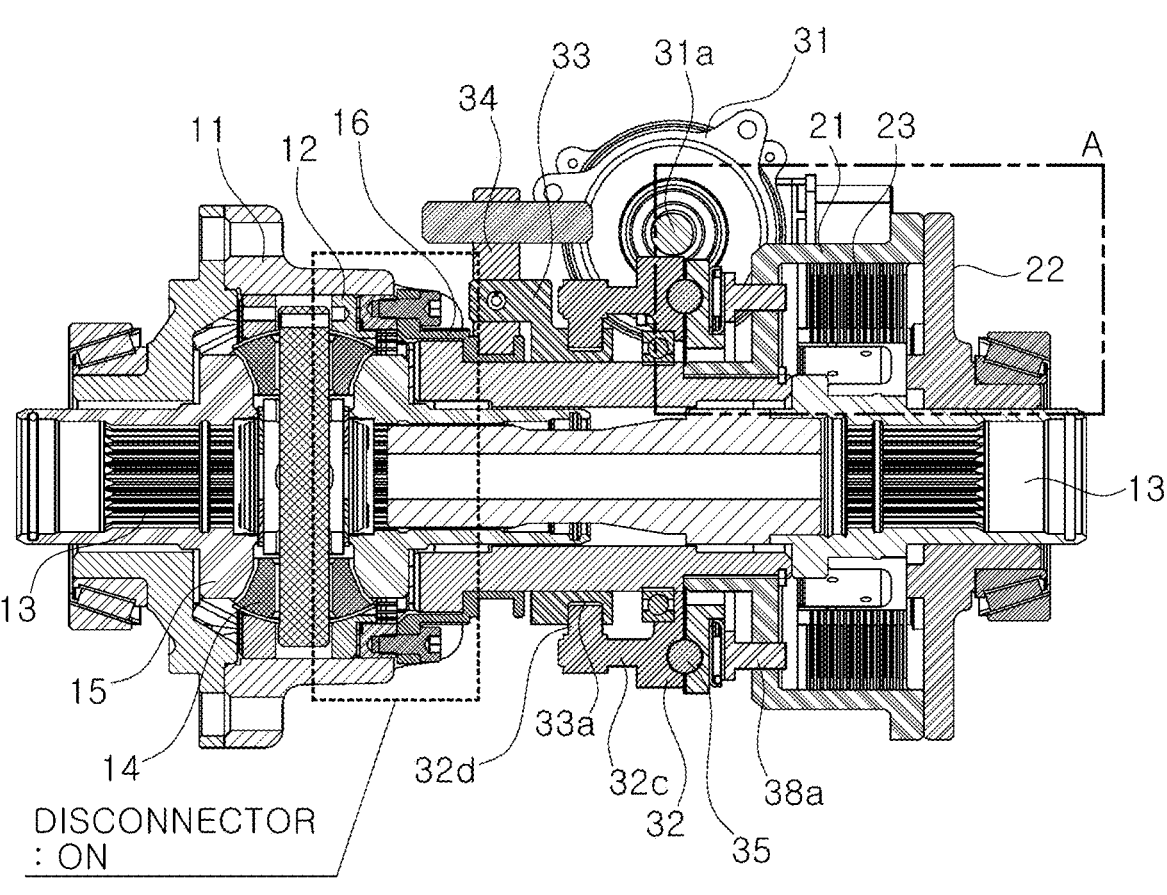

FIG. 7B is a cross-sectional view illustrating the disconnector device-eLSD device using the integrated actuator assembly for a disconnector device and an eLSD device according to the present disclosure when the disconnector device is turned on and the eLSD device is turned off.

Figure 7C:
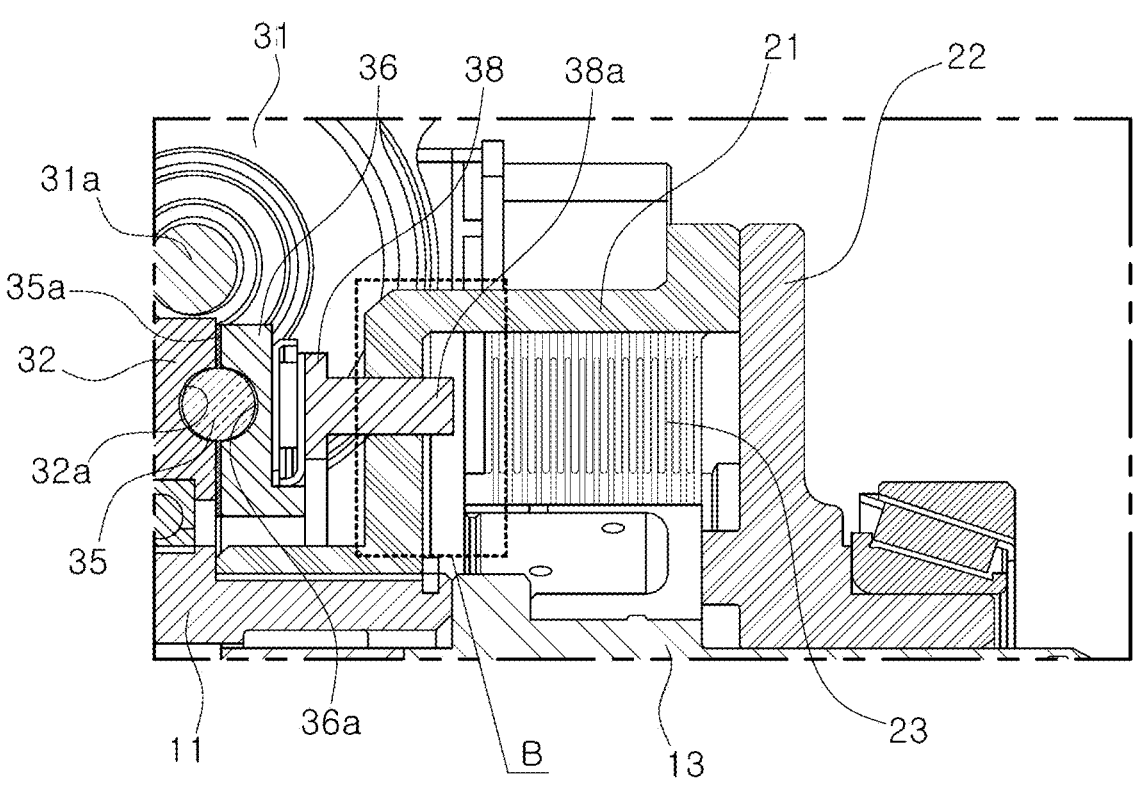

FIG. 7C is an enlarged view of portion A in FIG. 7B.

Figure 8A:
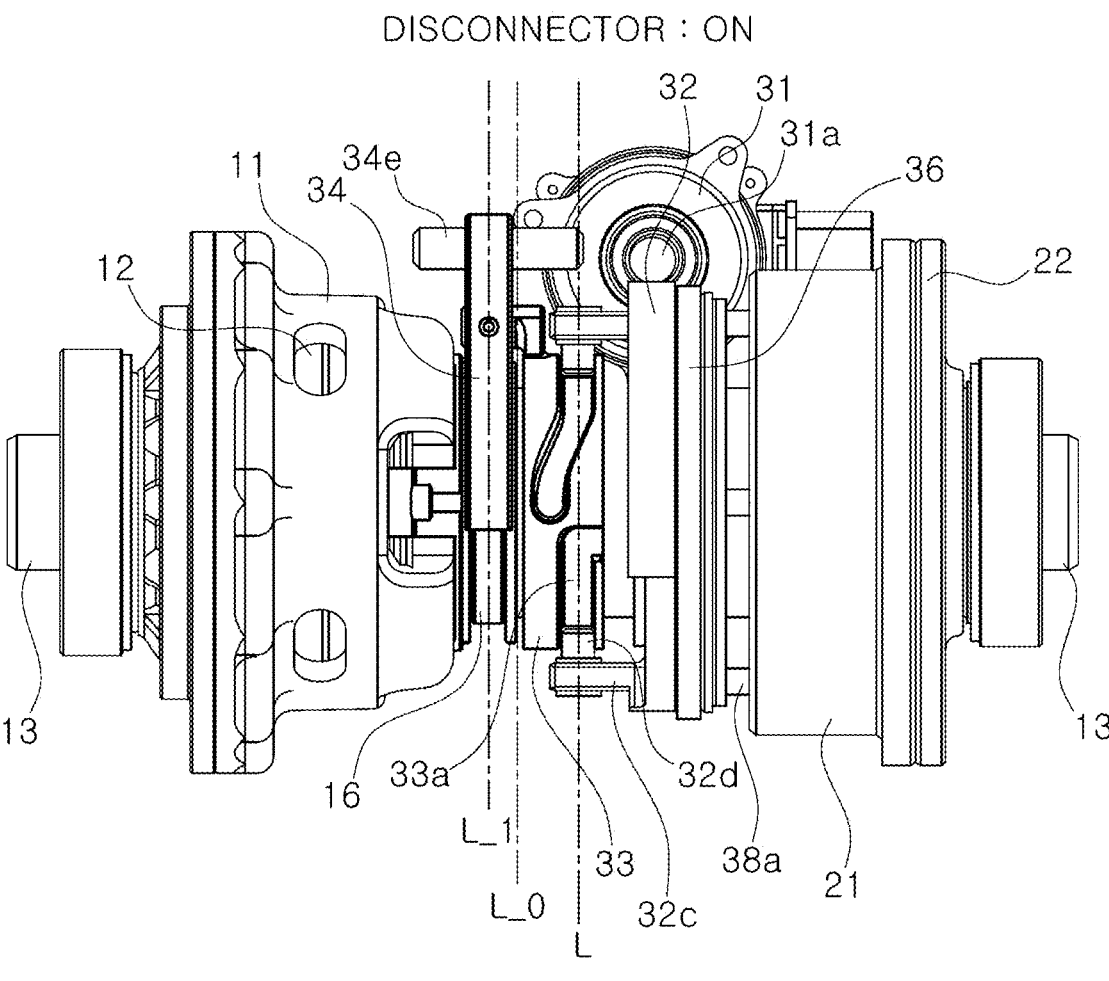

FIG. 8A is a side view illustrating the disconnector device-eLSD device using the integrated actuator assembly for a disconnector device and an eLSD device according to the present disclosure when the disconnector device is turned on and the eLSD device is turned on.

Figure 8B:
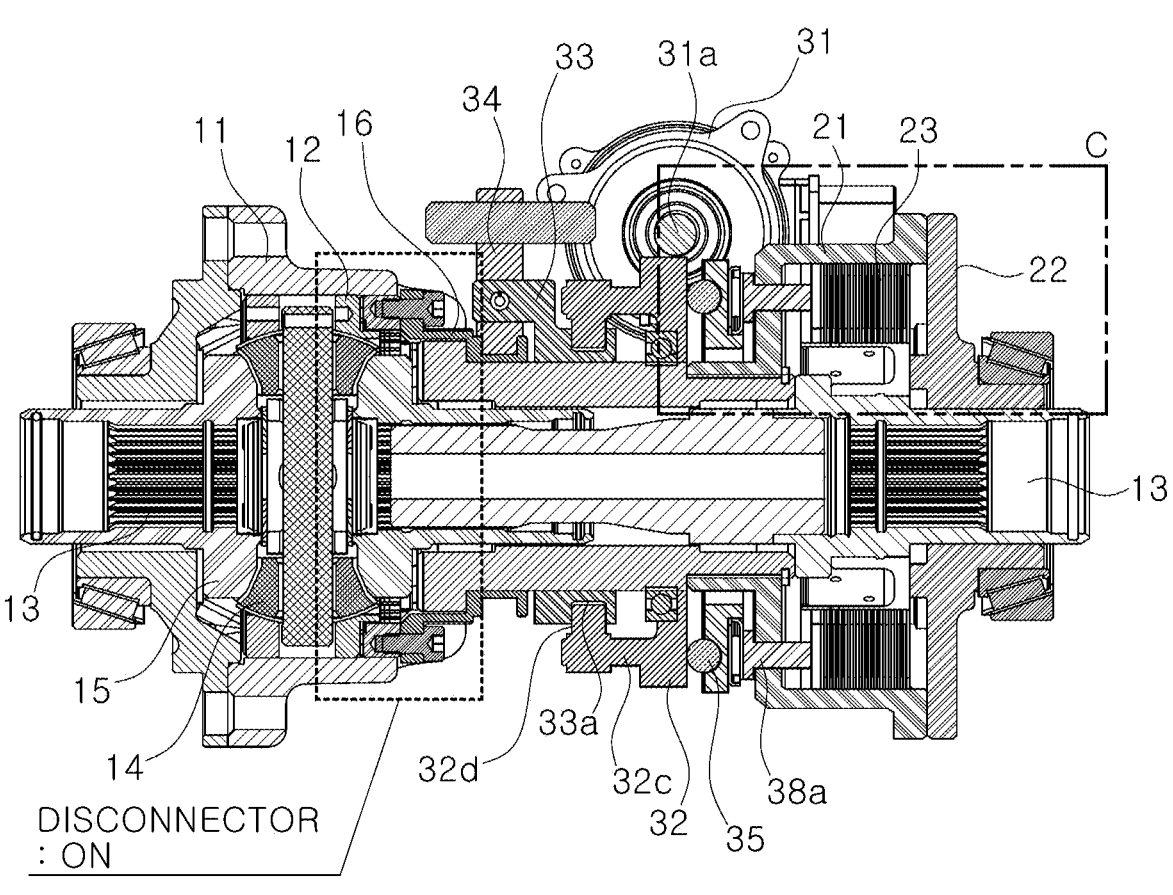

FIG. 8B is a cross-sectional view illustrating the disconnector device-eLSD device using the integrated actuator assembly for a disconnector device and an eLSD device according to the present disclosure when the disconnector device is turned on and the eLSD device is turned on.

Figure 8C:
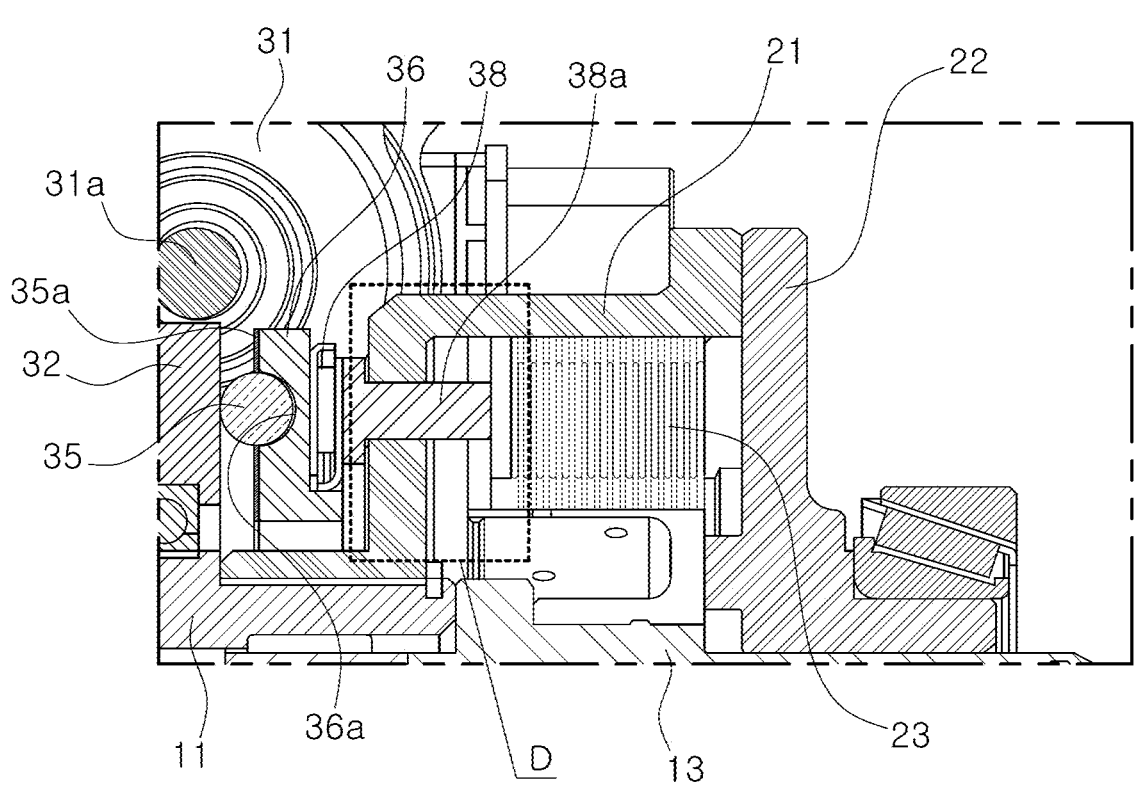

FIG. 8C is an enlarged view of portion C in FIG. 8B.

Figure 9:
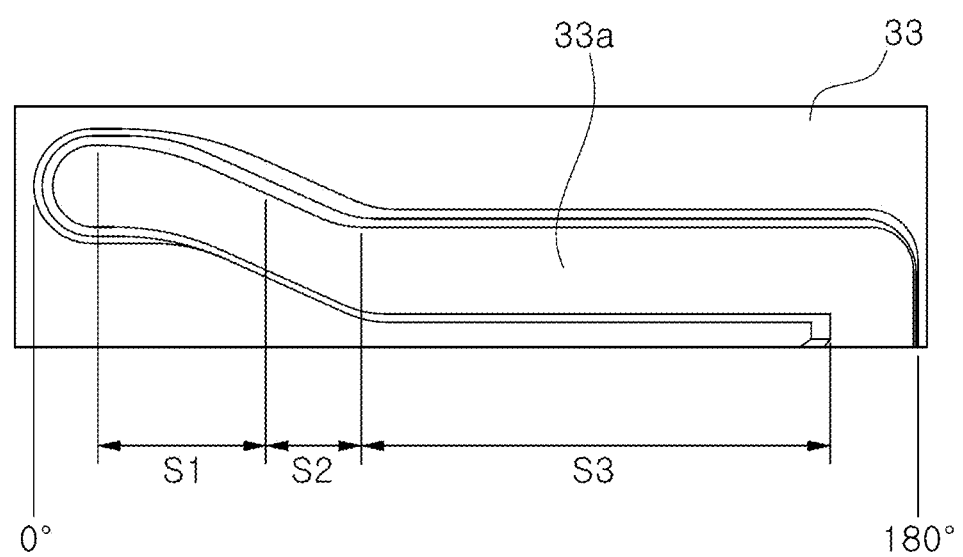

FIG. 9 is a plan view illustrating a profile of a slot formed in a shift guide in the integrated actuator assembly for a disconnector device and an eLSD device according to the present disclosure.

DETAILED DESCRIPTION

Hereinafter, an integrated actuator assembly for a disconnector device and an electronic limited slip differential (eLSD) device according to the present disclosure will be described in detail with reference to the accompanying drawings.

Figure 1:
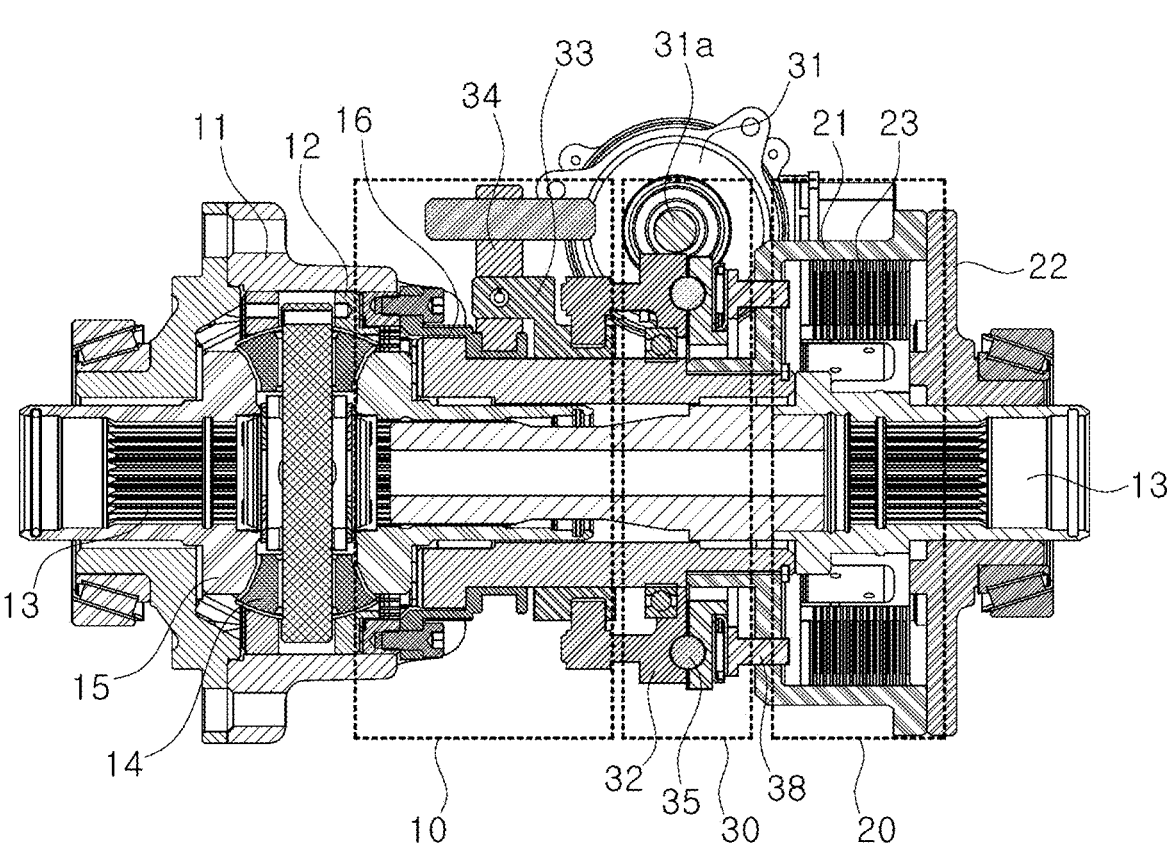
FIG. 1 is a cross-sectional view of a disconnector device—an electronic limited slip differential (eLSD) device in which an integrated actuator assembly for a disconnector device and an eLSD device according to the present disclosure is used.
Figure 2:
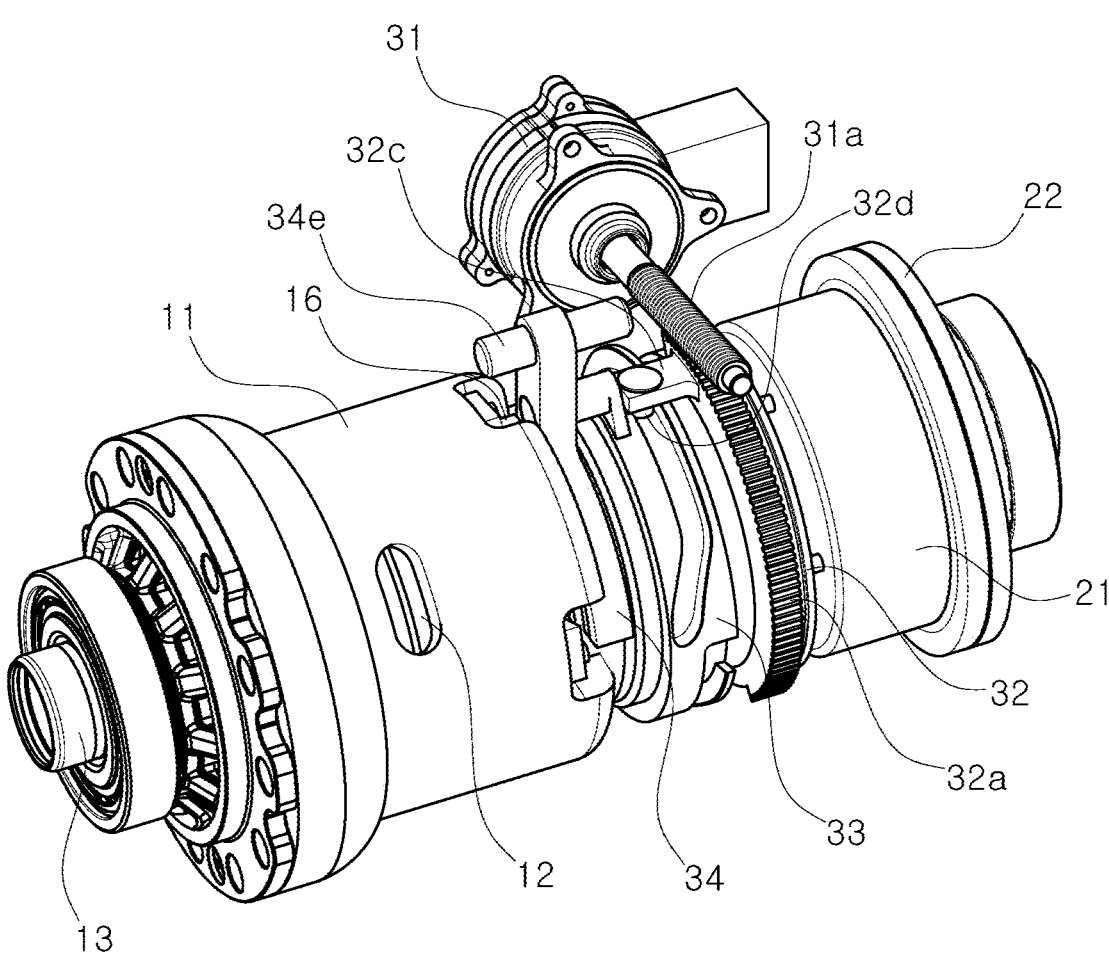
FIG. 2 is a perspective view of the disconnector device-eLSD device in which the integrated actuator assembly for a disconnector device and an eLSD device according to the present disclosure is used.

Referring to FIGS. 1 and 2, a disconnector device 10 includes an outer case 11 into which a rotation force is input from the outside, an inner case 12 provided inside the outer case 11, and an output shaft 13 installed to pass through the outer case 11.

The disconnector device 10 has a pinion gear 15 installed on the output shaft 13 and a side gear 14 installed on the inner case 12, and the pinion gear 15 and the side gear 14 are engaged.

In a state in which the outer case 11 and the inner case 12 are not fastened, the rotation force input to the outer case 11 is not transmitted to the inner case 12, but when the outer case 11 and the inner case 12 are coupled, the rotation force input to the outer case 11 is output to the output shaft 13 through the inner case 12, the side gear 14, and the pinion gear 15.

The outer case 11 and the inner case 12 are fastened to or separated by a sleeve 16 which slides in an axial direction of the output shaft 13.

Since the sleeve 16 is connected to a shift fork 34 sliding in the axial direction of the output shaft 13, when the shift fork 34 slides, the disconnector device 10 is fastened or not fastened.

An electronic limited slip differential (eLSD) device 20 is connected to the output shaft 13, and the eLSD device 20 has a multi-plate clutch 23 installed therein to prevent the rotation force from being concentrated on one side of the output shaft 13 and not being transmitted to the other side in the disconnector device 10.

The eLSD device 20 has a multi-plate clutch 23 in which clutches connected to each of the housing 21 and the output shaft 13 are alternately disposed in a space formed between the housing 21 and a cover 22, and when the multi-plate clutch 23 is pressed in the axial direction of the output shaft, the clutches are in contact with each other (operation state), thereby restricting the output shaft 13 installed inside the eLSD device 20. Accordingly, it is possible to prevent the rotation force from being transmitted to only one side in the disconnector device 10.

The multi-plate clutch 23 passes through the housing 21, and the clutches of the multi-plate clutch 23 are in contact with each other by a piston unit 38 pressing the multi-plate clutch 23 in the axial direction so that the eLSD device 20 is operated, or the clutches of the multi-plate clutch 23 are separated so that the eLSD device 20 is not operated.

The present disclosure provides an integrated actuator which allows the disconnector device 10 to be fastened or not to be fastened or the eLSD device 20 to be operated or not to be operated so that one actuator operates the disconnector device 10 and the eLSD device 20.

To this end, the actuator is provided as a ball ramp operation unit 30 which slides the shift fork 34 and the piston unit 38 to move in a direction away from each other while rotated by a driving motor 31.

The ball ramp operation unit 30 causes the eLSD device 20 to be operated after a predetermined time interval since the disconnector device 10 has been fastened. Accordingly, a time interval is formed between the fastened state of the disconnector device 10 and the operation state of the eLSD device 20. Meanwhile, upon operating in an opposite direction, the ball ramp operation unit 30 changes the fastened state to the non-fastened state of the disconnector device 10 after a predetermined time interval since the eLSD device 20 changes from the operation state to the non-operation state.

The ball ramp operation unit 30 includes a fixed ramp 32 rotated by the driving motor 31, the shift guide 33 having a slot 33a having a predetermined profile along circumference thereof formed therein, connected to the fixed ramp 32 to convert the rotational motion into the linear motion of the fixed ramp 32, and sliding the shift fork 34, a movable ramp 36 slid by the rotation of the fixed ramp 32 and sliding the piston unit 38, and a ball 35 disposed between the fixed ramp 32 and the movable ramp 36 and pushing the movable ramp 36 to the multi-plate clutch 23 by the rotation of the fixed ramp 32.

When power is applied, the driving motor 31 rotates to change the disconnector device 10 to the fastened state or the non-fastened state or change the eLSD device 20 to the operation state or the non-operation state.

A driving gear 31a is provided on the output shaft 13 of the driving motor 31.

The fixed ramp 32 is rotated by the driving motor 31. The driving motor 31 rotates the fixed ramp 32. The fixed ramp 32 is installed rotatably outside a case (no reference numeral) installed outside the output shaft 13.

Outside the fixed ramp 32, a gear unit 32a is formed in a circumferential direction of the fixed ramp 32, and the gear unit 32a is engaged with the driving gear 31a, and thus the fixed ramp 32 is rotated by the driving motor 31.

Meanwhile, the driving gear 31a and the gear unit 32a may be engaged in a worm-worm wheel manner.

In particular, the gear unit 32a is not formed along the entire circumference of the driving gear 31a, but is formed only at a predetermined angle in the circumferential direction of the fixed ramp 32. Accordingly, the fixed ramp 32 rotates only within a predetermined angle range to change the states of the disconnector device 10 and the eLSD device 20.

The fixed ramp 32 rotates without moving in the axial direction of the output shaft 13.

A component for operating the shift guide 33 is formed on one side surface of the fixed ramp 32, that is, a surface facing the disconnector device 10, and the shape for operating the movable ramp 36 is formed on the other surface of the fixed ramp 32.

Figure 3:
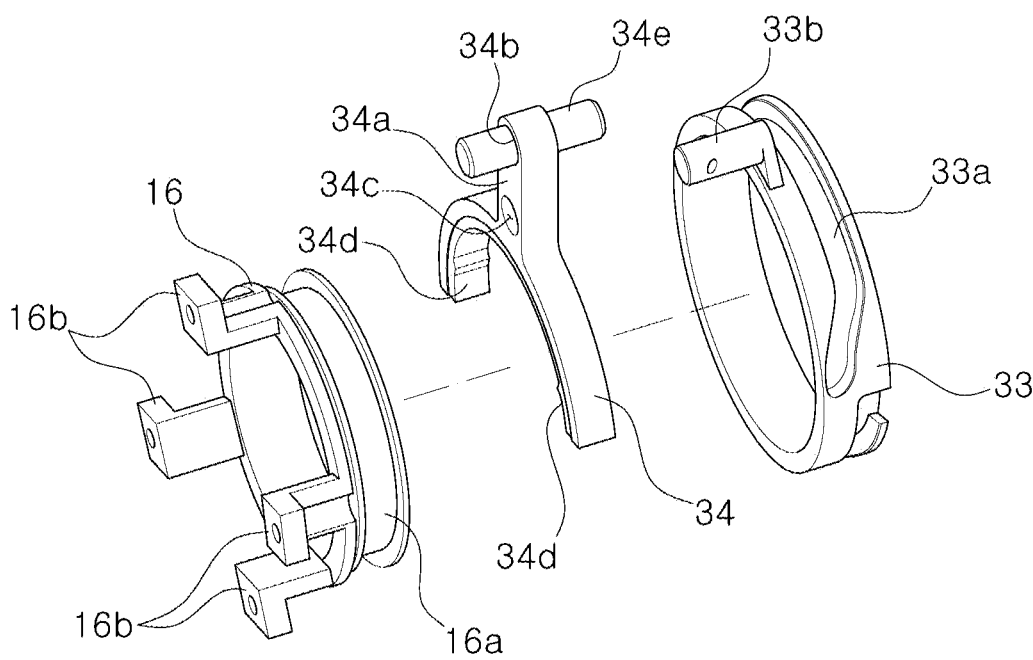
FIG. 3 is an exploded perspective view illustrating components of the integrated actuator assembly for a disconnector device and an eLSD device according to the present disclosure, which operate a disconnector device.
Figure 4:
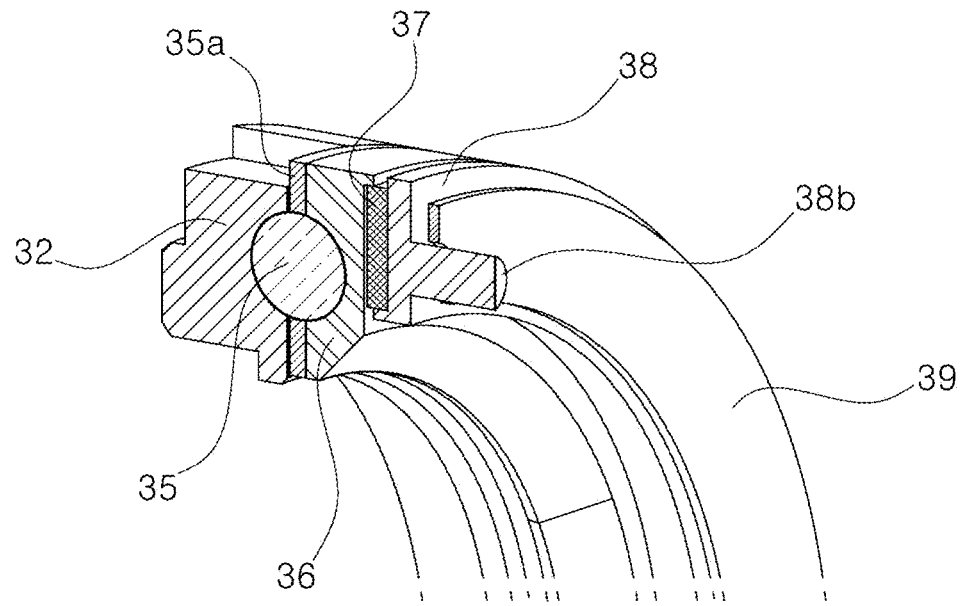
FIG. 4 is a cut perspective view illustrating components of the integrated actuator assembly for a disconnector device and an eLSD device according to the present disclosure, which operate the eLSD device.

An extension 32c extending toward the shift guide 33 is formed on the one side surface of the fixed ramp 32, and a finger 32d of which an end portion is inserted into the slot 33a is formed on the extension 32c, as shown in FIG. 3.

A ball accommodation groove 32b having a predetermined depth from the other side surface of the fixed ramp 32 and accommodating the ball 35 at a predetermined angle in the rotation direction of the fixed ramp 32 is formed on the other side surface of the fixed ramp 32.

The shift guide 33 has the slot 33a having the predetermined profile along the circumference thereof formed therein, and the finger 32d of the fixed ramp 32 is inserted into the slot 33a. By inserting the finger 32d into the slot 33a, the fixed ramp 32 and the shift guide 33 are connected to convert the rotation motion of the fixed ramp 32 into the linear motion of the shift guide 33 so that the state of the disconnector device 10 is changed. That is, when the fixed ramp 32 rotates, the finger 32d slides the shift guide 33 while rotating inside the slot 33a.

To this end, referring to the profile formed in the slot 33a, as illustrated in FIG. 9, a first rotation section S1, an inclined section S2, and a second rotation section S3 are formed to be connected in the circumferential direction of the shift guide 33.

The first rotation section S1 is formed at a predetermined angle in the circumferential direction of the shift guide 33. In the first rotation section S1, even if the fixed ramp 32 rotates, since the finger 32d moves in the first rotation section S1 formed in the circumferential direction of the shift guide 33, the rotational motion of the fixed ramp 32 is not converted into linear motion. In the first rotation section S1, the disconnector device 10 and the eLSD device 20 maintain their states.

The inclined section S2 is formed to be connected to the first rotation section S1. When the fixed ramp 32 rotates in a state in which the finger 32d is positioned in the inclined section, the shift guide 33 performs the linear motion. As the finger 32d moves in the inclined section S2, the state of the disconnector device 10 is changed.

The second rotation section S3 is formed at a predetermined angle in the circumferential direction of the shift guide 33. Even in the second rotation section, like the first rotation section S1, even if the finger 32d moves in the circumferential direction of the shift guide 33 in the second rotation section S3, the rotation motion of the fixed ramp 32 is not converted into the linear motion. However, the second rotation section S3 is formed to extend in the circumferential direction of the shift guide 33 more than the first rotation section S1. It is to press the movable ramp 36 on the other side surface of the fixed ramp 32 while the finger 32d moves in the second rotation section S3 to change the state of the eLSD device 20. The second rotation section S3 is formed to be positioned closer to the fixed ramp 32 than the first rotation section S1.

The slot 33a is formed as a plurality of slots in the circumferential direction of the shift guide 33, and each slot 33a is formed to have the same profile. When two slots 33a are formed in the shift guide 33, one slot 33a has the first rotation section S1 to the second rotation section S3 formed in a section from 0 degrees to 180 degrees.

A connection protrusion 33b protruding in the axial direction of the output shaft 13 is formed at an upper end of the shift guide 33. The connection protrusion 33b is formed from the shift guide 33 toward the disconnector device 10.

Referring again to FIG. 3, the shift fork 34 is connected to the shift guide 33 to move linearly along with the shift guide 33.

The shift fork 34 has a connection portion 34a extending upward from the upper end formed thereon, and a connection hole 34c through which the connection protrusion 33b passes and is fastened is formed in the connection portion 34a. As the connection protrusion 33b is fixedly inserted into the connection hole 34c, the shift fork 34 performs the linear motion in the axial direction of the output shaft 13 along with the shift guide 33.

A through hole 34b through which a guide rod 34e guiding the linear motion of the shift fork 34 passes is formed in an upper portion of the connection portion 34a of the shift fork 34.

The shift fork 34 extends downward, and a fork portion 34d holding the sleeve 16 is formed on the shift fork 34. Since the fork portion 34d is inserted into a fork accommodation groove 16a formed in the sleeve 16, when the shift fork 34 performs the linear motion, the sleeve 16 also performs the linear motion to change the state of the disconnector device 10 to one of the fastened state and the non-fastened state. A fastening portion 16b fastening the outer case 11 and the inner case 12 is formed along the circumference of the sleeve 16.

Meanwhile, the component for changing the state of the eLSD device 20 is installed between the other side surface of the fixed ramp 32, that is, the surface facing the eLSD device 20, and the eLSD device 20.

Figure 5:
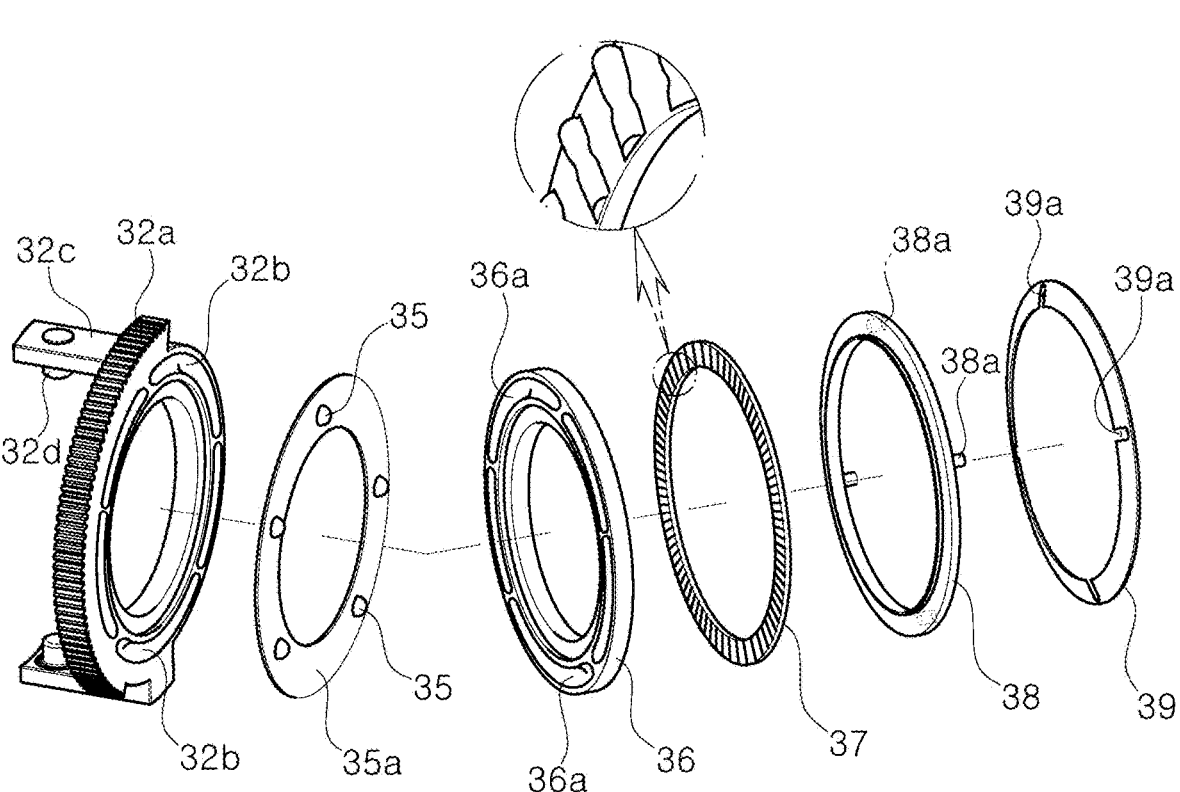
FIG. 5 is an exploded perspective view illustrating components of the integrated actuator assembly for a disconnector device and an eLSD device according to the present disclosure, which operate the eLSD device.

As shown in FIG. 5, the ball accommodation groove 32b is formed in the other side surface of the fixed ramp 32. The ball accommodation groove 32b is formed to have a predetermined depth from the other side surface of the fixed ramp 32 and formed by a predetermined angle section in the rotation direction of the fixed ramp 32. A cross section of the ball accommodation groove 32b is formed in a semicircular shape to accommodate one side of the ball 35.

A part of the ball 35 is inserted into the ball accommodation groove 32b. The balls 35 are formed at intervals in the circumferential direction of the fixed ramp 32. A cage 35a may be provided so that a plurality of the balls 35 maintain the interval.

The movable ramp 36 does not rotate, but is slid toward the eLSD device 20 by the rotation of the fixed ramp 32. Another ball accommodation groove 36a accommodating the ball 35 is formed in a surface of the movable ramp 36, which faces the fixed ramp 32.

When the fixed ramp 32 rotates and the ball 35 is positioned between two adjacent ball accommodation grooves 32b, the movable ramp 36 is pushed toward the multi-plate clutch 23 of the eLSD device 20 to press the multi-plate clutch 23.

A piston 38a protruding toward the multi-plate clutch 23 in the circumference of the piston unit 38 is formed on the piston unit 38. The piston unit 38 is slid to the multi-plate clutch 23 by the movable ramp 36. Since the piston 38a is installed so that the housing 21 passes therethrough, when the movable ramp 36 slides toward the multi-plate clutch 23, an end portion of the piston 38a presses the multi-plate clutch 23.

A needle bearing unit 37 having a needle bearing installed in the circumference may be provided between the movable ramp 36 and the piston unit 38.

In addition, a ring-shaped return spring 39 is provided on the other side surface of the piston unit 38, that is, a surface of the piston unit 38, which faces the multi-plate clutch 23. The return spring 39 elastically supports the piston unit 38 in a direction away from the multi-plate clutch 23 so that the eLSD device 20 is restored from the operation state to the non-operation state. A piston through groove 39a through which the piston 38a passes is formed in the return spring 39.

An operation of the integrated actuator assembly for a disconnector device and an eLSD device according to the present disclosure having the above configuration is as follows.

FIGS. 6A to 8C illustrate a process in which the disconnector device 10 and the eLSD device 20 are changed from the non-fastened state and non-operation state to the fastened state and the operation state while the driving motor 31 rotates in one direction.

Figure 6A:
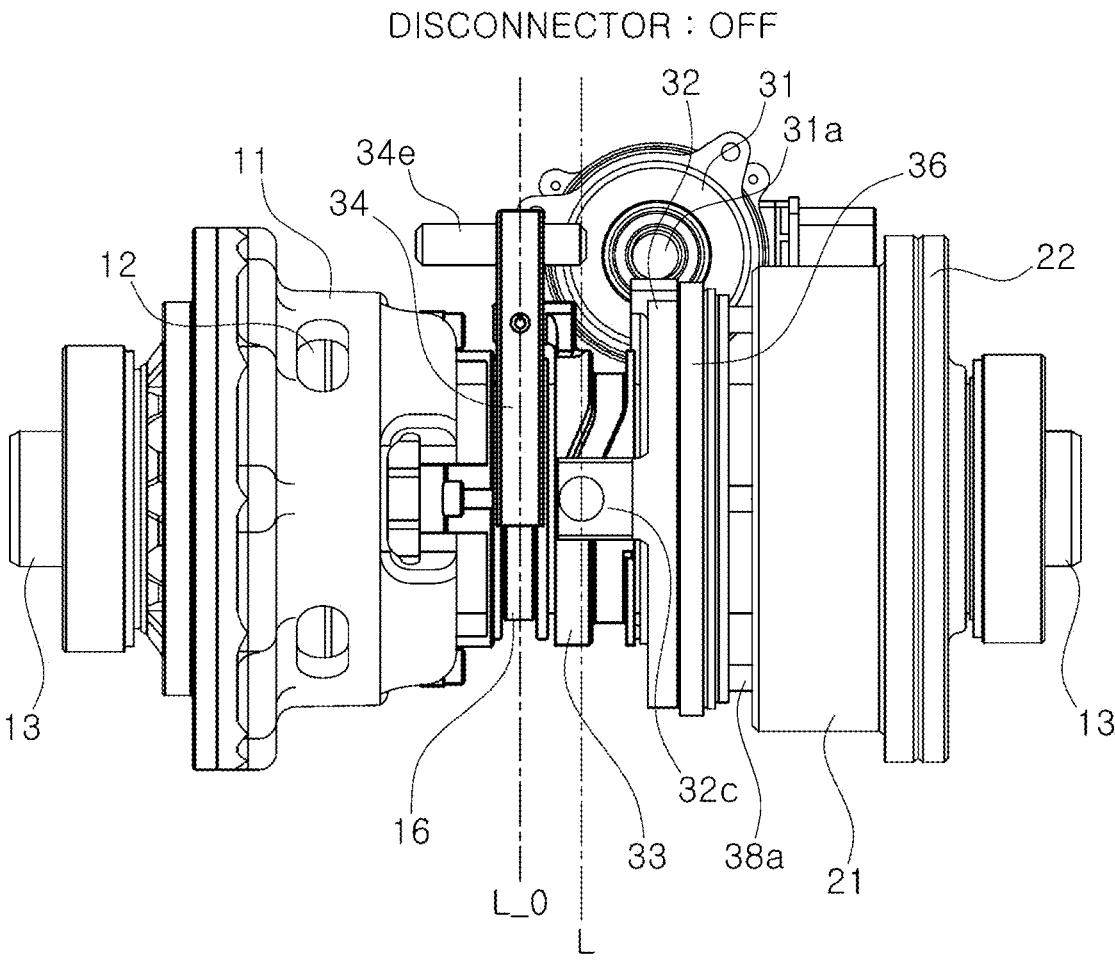
FIG. 6A is a side view illustrating a disconnector device-eLSD device using the integrated actuator assembly for a disconnector device and an eLSD device according to the present disclosure when the disconnector device is turned off and the eLSD device is turned off.
Figure 6B:
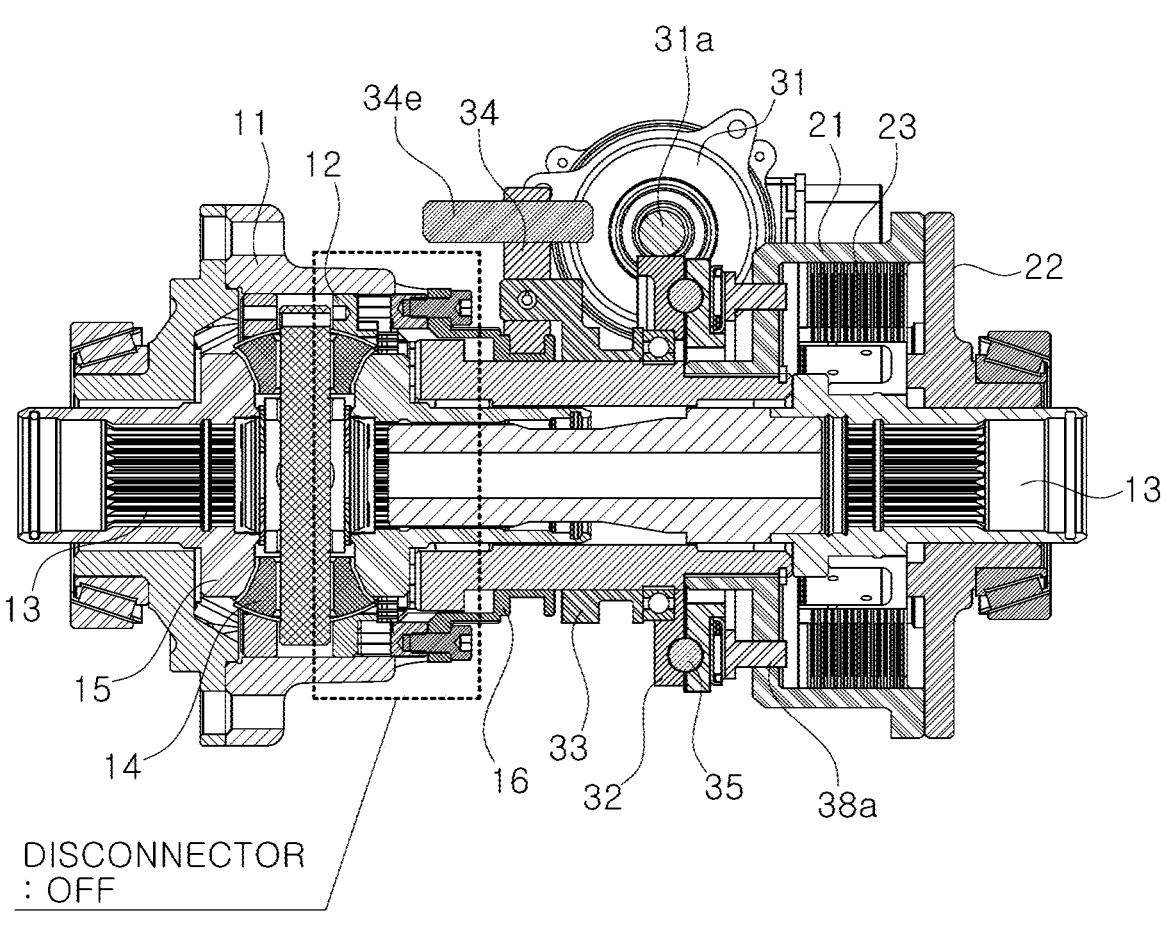
FIG. 6B is a cross-sectional view illustrating the disconnector device-eLSD device using the integrated actuator assembly for a disconnector device and an eLSD device according to the present disclosure when the disconnector device is turned off and the eLSD device is turned off.

FIGS. 6A and 6B illustrate that an initial state, that is, the disconnector device 10 and the eLSD device 20 are not fastened and not operated, respectively.

In the initial state, the finger 32d of the fixed ramp 32 is positioned in the first rotation section S1.

In FIGS. 7A to 7C, the finger 32d of the fixed ramp 32 enters the inclined section S2 from the first rotation section S1 and passes through the inclined section S2. When the finger 32d passes through the inclined section S2 from the first rotation section S1 to the second rotation section S3, the rotation motion of the fixed ramp 32 is converted into the linear motion of the shift guide 33. That is, in FIG. 7A, the shift guide 33 moves from L_0 to L_1. Accordingly, since the shift fork 34 pushes the sleeve 16 to fasten the outer case 11 and the inner case 12, the disconnector device 10 is changed to the fastened state.

At this time, the fixed ramp 32 maintains an initial position L. In particular, as illustrated in FIG. 7C (see portion B in FIG. 7C), the piston 38a does not yet press the multi-plate clutch 23.

FIGS. 8A to 8C illustrate that the finger 32d of the fixed ramp 32 enters the second rotation section S3 and moves in the second rotation section S3.

In the second rotation section S3, the rotation motion of the fixed ramp 32 is not converted into the linear motion of the shift guide 33, and only the fixed ramp 32 rotates. Accordingly, since the shift guide 33 maintains the state of moving forward to the disconnector device 10, the disconnector device 10 maintains the fastened state. Meanwhile, as the fixed ramp 32 rotates, the ball 35 is positioned between two adjacent ball accommodation grooves 32b so that one side surface of the ball 35 is supported by the other side surface of the fixed ramp 32 to push the movable ramp 36 toward the multi-plate clutch 23. Accordingly, the piston unit 38 presses the multi-plate clutch 23 (see portion D in FIG. 8C) so that the eLSD device 20 is changed to the operation state.

In addition, in the second rotation section S3, even if the fixed ramp 32 rotates, the shift guide 33 is prevented from performing the linear motion, and thus the shift guide 33 does not generate a stroke.

Meanwhile, when the driving motor 31 rotates in the opposite direction, the fixed ramp 32 rotates in the opposite direction, and the disconnector device 10 and the eLSD device 20 are changed from the fastened state and the operation state to the non-fastened state and the non-operation state. At this time, the eLSD device 20 is changed from the fastened state to the non-operation state in the second rotation section, and the disconnector device 10 is changed from the fastened state to the non-fastened state in the inclined section S2, and the disconnector device 10 and the eLSD device 20 maintain the non-fastened state and the non-operation state in the first rotation section S1.

While the present disclosure has been described with reference to the accompanying drawings, it will be apparent to those skilled in the art that various changes and modifications can be made without departing from the spirit and scope of the present disclosure without being limited to the exemplary embodiments disclosed herein. Accordingly, it should be noted that such alternations or modifications fall within the claims of the present disclosure, and the scope of the present disclosure should be construed on the basis of the appended claims.

The invention claimed is:

1. An integrated actuator assembly for a disconnector device and an electronic limited slip differential (eLSD) device, the integrated actuator assembly comprising:

a driving motor;

a shift fork configured to slide into a fastened state of the disconnector device in which an outer case and an inner case of the disconnector device are fastened in an axial direction of an output shaft;

a piston unit including a piston configured to press a multi-plate clutch of the eLSD device in the axial direction of the output shaft so that the eLSD device is in an operation state in which the multi-plate clutch is operated; and a ball ramp operation unit configured to slide the shift fork and the piston unit to operate in a direction away from each other as rotated by the driving motor;

wherein the ball ramp operation unit allows the eLSD device to be in the operation state after rotating at a predetermined angle after the disconnector device has been fastened, wherein the ball ramp operation unit includes:

a fixed ramp configured to be rotated by the driving motor;

a shift guide having a slot having a predetermined profile along a circumference formed within the shift guide, connected to the fixed ramp to change a rotation motion to a linear motion of the fixed ramp, and configured to slide the shift fork;

wherein an extension extending toward the shift guide is formed on one side surface of the fixed ramp, and a finger including an end portion inserted into the slot is formed on the extension; and wherein, when the fixed ramp rotates, the finger is configured to slide the shift guide while rotating inside the slot.

2. The integrated actuator assembly of claim 1, wherein the ball ramp operation unit further includes:

a movable ramp configured to slide by rotation of the fixed ramp and configured to slide the piston unit; and a ball positioned between the fixed ramp and the movable ramp, and configured to push the movable ramp to the multi-plate clutch by rotation of the fixed ramp.

3. The integrated actuator assembly of claim 2, wherein the disconnector device has a sleeve connected to the shift fork configured to slide along the output shaft so that the outer case and the inner case are fastened.

4. The integrated actuator assembly of claim 2, wherein a ball accommodation groove having a predetermined depth from a side surface of the fixed ramp, and accommodating the ball at a predetermined angle in a rotation direction of the fixed ramp is formed on the other side surface of the fixed ramp.

5. The integrated actuator assembly of claim 4, wherein, when the fixed ramp rotates and the ball is positioned between two adjacent ball accommodation grooves, the movable ramp is pushed toward the multi-plate clutch.

6. The integrated actuator assembly of claim 4, wherein the ball comprises a plurality of balls positioned at predetermined intervals in the rotation direction of the fixed ramp, and the plurality of balls are connected by a cage.

7. The integrated actuator assembly of claim 2, wherein the piston unit includes a piston protruding toward the multi-plate clutch along a circumference of the piston unit.

8. The integrated actuator assembly of claim 2, wherein a gear unit is formed on a circumference of the fixed ramp, and the gear unit is engaged with a driving gear positioned on an output shaft of the driving motor.

9. The integrated actuator assembly of claim 8, wherein the gear unit is formed at a predetermined angle along a circumferential direction of the fixed ramp.

10. The integrated actuator assembly of claim 2, wherein a side surface of the piston unit includes a return spring elastically supporting the piston unit in a direction away from the multi-plate clutch.

11. The integrated actuator assembly of claim 1, wherein the predetermined profile of the slot of the shift guide includes:

a first rotation section formed at a predetermined angle in a circumferential direction of the shift guide;

an inclined section connected to the first rotation section; and a second rotation section connected to the inclined section, and formed in the circumferential direction of the shift guide and positioned closer to the fixed ramp than the first rotation section.

12. The integrated actuator assembly of claim 11, wherein:

when the finger of the fixed ramp is positioned in the first rotation section, the disconnector device is in a non-fastened state and the eLSD device is in a non-operation state;

when the finger of the fixed ramp enters the inclined section from the first rotation section and passes through the inclined section, the disconnector device is changed to a fastened state and the eLSD device is in the non-operation state; and when the finger of the fixed ramp is positioned in the second rotation section, the disconnector device maintains the fastened state and the eLSD device is changed to the operation state.

13. The integrated actuator assembly of claim 11, wherein the second rotation section is longer than the first rotation section, and while the fixed ramp rotates in a state in which the finger is positioned in the second rotation section, the fixed ramp pushes the movable ramp.

14. The integrated actuator assembly of claim 1, wherein the slot comprises a plurality of slots positioned in a circumferential direction of the shift guide, and each of the plurality of slots has a same predetermined profile.

15. An electronic limited slip differential (eLSD) device comprising:

a disconnector device having integrated actuator assembly, the integrated actuator assembly comprising:

a driving motor;

a shift fork configured to fasten an outer case of the disconnector device to an inner case of the disconnector device in an axial direction of an output shaft;

a piston unit including a piston configured to operate a multi-plate clutch of the eLSD device in the axial direction of the output shaft; and a ball ramp operation unit configured to operate the shift fork and the piston unit in a direction away from each other as rotated by the driving motor;

wherein the ball ramp operation unit is configured to operate the eLSD device after rotating at a predetermined angle after the disconnector device has been fastened, wherein the ball ramp operation unit includes:

a fixed ramp configured to be rotated by the driving motor;

a shift guide having a slot formed along a circumference of the shift guide, the shift guide being connected to the fixed ramp and configured to change a rotation motion to a linear motion of the fixed ramp, and configured to operate the shift fork;

wherein an extension extending toward the shift guide is formed on one side surface of the fixed ramp, and a finger including an end portion inserted into the slot is formed on the extension, and when the fixed ramp rotates, the finger is configured to slide the shift guide while rotating inside the slot.

16. The electronic limited slip differential (eLSD) device of claim 15, wherein the ball ramp operation unit further includes:

a movable ramp configured to slide by rotation of the fixed ramp and configured to operate the piston unit; and a ball positioned between the fixed ramp and the movable ramp, and configured to push the movable ramp to the multi-plate clutch by rotation of the fixed ramp.

17. The electronic limited slip differential (eLSD) device of claim 16, wherein the slot of the shift guide includes:

a first rotation section formed at a predetermined angle in a circumferential direction of the shift guide;

an inclined section connected to the first rotation section; and a second rotation section connected to the inclined section and formed in the circumferential direction of the shift guide, wherein the second rotation section is positioned closer to the fixed ramp than the first rotation section.

18. The electronic limited slip differential (eLSD) device of claim 17, wherein the slot comprises a plurality of slots positioned in a circumferential direction of the shift guide, and each of the plurality of slots includes the first rotation section, the inclined section, and the second rotation section.

19. The electronic limited slip differential (eLSD) device of claim 16, wherein the disconnector device includes a sleeve connected to the shift fork, the sleeve being configured to slide along the output shaft to fasten the outer case to the inner case.

* * * * *